United States Patent [19]

Ono et al.

[11] Patent Number: 4,912,287
[45] Date of Patent: Mar. 27, 1990

[54] GROMMET

[75] Inventors: Mamoru Ono; Ichiro Kudo; Toshio Okazaki; Ichiro Yasue, all of Toyota, Japan

[73] Assignee: Yazaki Corporation, Japan

[21] Appl. No.: 400,683

[22] Filed: Aug. 30, 1989

[30] Foreign Application Priority Data

Aug. 31, 1988 [JP] Japan .................................. 63-216215

[51] Int. Cl.⁴ .......................... H01B 17/30; H02G 3/22
[52] U.S. Cl. .................................. 174/153 G; 248/56; 277/178; 277/212 FB
[58] Field of Search ............ 174/65 G, 152 G, 153 G, 174/167; 16/2; 248/56; 277/166, 178, 189, 212 F, 212 FB; 439/556, 559, 565, 567

[56] References Cited

U.S. PATENT DOCUMENTS 4,304,148 12/1981 Hamman ........................... 248/56 X
4,839,937 6/1989 Oikawa et al. .............. 174/153 G X

FOREIGN PATENT DOCUMENTS 59-25115 2/1984 Japan .................................. 174/153 G Primary Examiner—Laramie E. Askin
Attorney, Agent, or Firm—Wigman & Cohen

[57] ABSTRACT

Disclosed herein is a grommet for supporting a bundle of electric wires which passes a fixing hole formed in a partition panel. The grommet comprises an elastic member and a rigid member to be assembled with the elastic member. The elastic member has a wire securing portion in which the bundle of the electrical wires is secured, a sealing lip to be in contact with the partition panel and a fitting portion having an outer periphery on which a concave portion is formed. The rigid member has a lock portion to be locked with the partition panel and a fitted portion to be fitted onto the fitting portion of the elastic member. The fitted portion has an inner periphery on which a convex portion to be engaged with the concave portion of the fitting portion of the elastic member when the elastic member is assembled with the rigid member is formed. The grommet can realize easy and stable composition of the elastic portion and the rigid portion with high sealability.

8 Claims, 2 Drawing Sheets

FIG..3
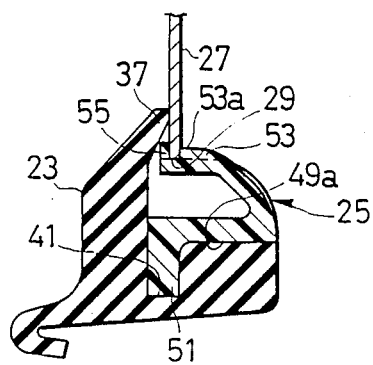
FIG.4
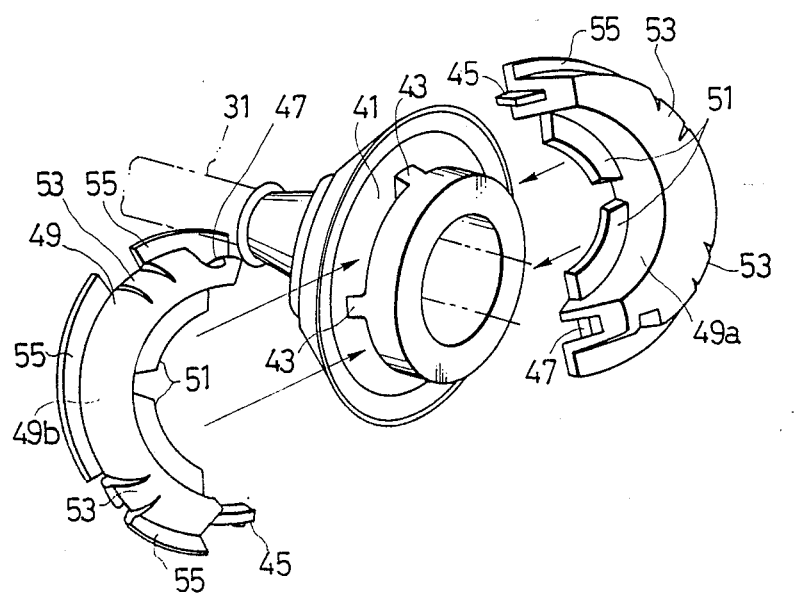

GROMMET

BACKGROUND OF THE INVENTION

1. Field of the Invention

The present invention relates to a grommet for supporting a bundle of electric wires which are inserted, for example, in a fixing hole formed in a partition panel between an engine room and a compartment of an automobile, and particularly to a grommet which comprises an elastic member to be secured around the bundle of the electric wires and a rigid member to be mounted to the fixing hole of the partition panel and being assembled with the elastic member.

2. Description of the Prior Art

When electric wires are wired through a partition panel between an engine room and a compartment of an automobile, it is attempted to protect the wires and seal between the engine room and the compartment by a grommet which is mounted to a fixing hole formed in the partition panel. When such a grommet is integrally formed with rubber, the grommet is excellent in sealability. However, it is difficult to mount the grommet to the partition panel due to its structure. Further, when the wires are pulled with some force, the grommet will likely be removed easily from the fixing hole due to its elasticity.

For these reasons, there is conventionally proposed a grommet which comprises an elastic member formed from rubber to have a sealing effect, and a rigid member formed from a synthetic resin to guarantee attachment to the partition panel. Such a grommet is, for example, shown in Japanese Utility Model Publication No. 59-25115.

The conventional grommet will be described with reference to FIG. 1. Namely, an elastic member 1 has a cylindrical wire securing portion 5 through which a bundle of electric wires 3 passes and in which the bundle is secured, and a sealing lip 9 for contacting a partition panel 7. Further, a rigid member 11 has a flange 15 to be fitted in a groove 13 which is formed inside the elastic member 1, and a lock portion 17 which is in engagement with the partition panel 7 by being flexibly deformed and then restored when the rigid member 11 is fitted to the fixing hole 7a of the partition panel 7.

The grommet having such a construction is mounted to the partition panel 7 by securing the wire securing portion 5 of the elastic member 1 around the bundle of the electric wires 3, inserting the flange 15 of the rigid member 11 into the groove 13 of the elastic member 1, and then assembling integrally the elastic member 1 and the rigid member 11. Thereafter, thus integrally assembled grommet is inserted and fixed to the fixing hole 7a of the partition panel 7 from the left side of the partition panel 7 in the drawing.

However, in the conventional grommet, the flange portion 15 of the rigid member 11 needs to be fitted into the groove 13 formed inside the elastic member 1 when the elastic member 1 is assembled with the rigid member 11, and so the groove 13 must be expanded outwardly at that time in order to receive the flange portion 15 in the groove 13. Moreover, the bundle of the electric wires 3 becomes a hindrance during the fitting operation because it is present inside the grommet.

In order to eliminate the trouble caused by the bundle of electric wires 3, it is possible to assemble the elastic member 1 and the rigid member 11 integrally before the bundle of electric wires 3 is inserted into the elastic member 1. However, since the wire securing portion 5 of the elastic member 1 has to be generally expanded at the time of the insertion of the bundle of the wires 3, the elastic member 1 may come off the rigid member 11 due to the expansion, so that this method is not preferable. In addition to this, since the flange 15 of the rigid member 11 is urged from the outside thereof by the elastic member 1, these two members are likely to be disengaged.

SUMMARY OF THE INVENTION

It is therefore an object of the present invention to provide a grommet which can realize easy and stable engagement of an elastic member and a rigid member to be combined with the elastic member.

In order to achieve the above-mentioned object, a grommet for supporting a bundle of electric wires which passes a fixing hole formed in a partition panel according to the present invention comprises an elastic member and a rigid member to be assembled with the elastic member. The elastic member has a wire securing portion in which the bundle of the electrical wires is secured, a sealing lip to be in contact with the partition panel and a fitting portion having an outer periphery on which a concave portion is formed. The rigid member has a lock portion to be locked with the partition panel and a fitted portion to be fitted onto the fitting portion of the elastic member. The fitted portion has an inner periphery on which a convex portion to be engaged with the concave portion of the fitting portion of the elastic member when the elastic member is assembled with the rigid member is formed.

When the elastic member and the rigid member are composed integrally, the convex portion formed on the inner periphery of the fitted portion of the rigid member is firmly engaged in the concave portion of the outer periphery of the fitting portion of the elastic member. At this time, since the rigid member can be attached to the elastic member from the outside of the elastic member, it is not necessary to expand the elastic member. Therefore, the elastic member is easily fixed to the rigid member. Further, since the outside of the elastic member is held by the rigid portion in the engaged state, it is difficult for the elastic member to come off the rigid portion even when the elastic member undergoes slight deformations.

In the present invention, the rigid member may be formed from a pair of half-cup members which are engageable with each other. Thus constituted grommet can be easily assembled since the rigid member can be easily attached to the elastic member. In this case, the half-cup members may be coupled by a hinge.

Further, the concave portion of the fitting portion of the elastic member can be formed from a circumferential groove formed on the fitting portion of the elastic member. Furthermore, it is also possible to provide a plurality of ribs in the circumferential groove and constitute the convex portion of the fitted portion of the rigid member from a plurality of protrusions to be engaged with the ribs, respectively. In the case where the concave and convex portions are constituted so, more stable fitting condition between the elastic member and the rigid member can be obtained.

Furthermore, it is also possible to connect the wire securing portion of the elastic member with the sealing lip through a flexibly bent portion. Thus constituted elastic member can absorb external force exerted on the wire securing portion of the elastic member at the flexibly bent portion.

These and other objects, features and advantages of the present invention will be more apparent from the following description of a preferred embodiment, taken in conjunction with the accompanying drawings.

BRIEF DESCRIPTION OF THE DRAWINGS

FIG. 3 is an enlarged cross sectional view of a primary portion of FIG. 2; and

FIG. 4 is an exploded perspective view of the embodiment of the present invention.

DETAILED DESCRIPTION OF THE PREFERRED EMBODIMENT

Figure 1:
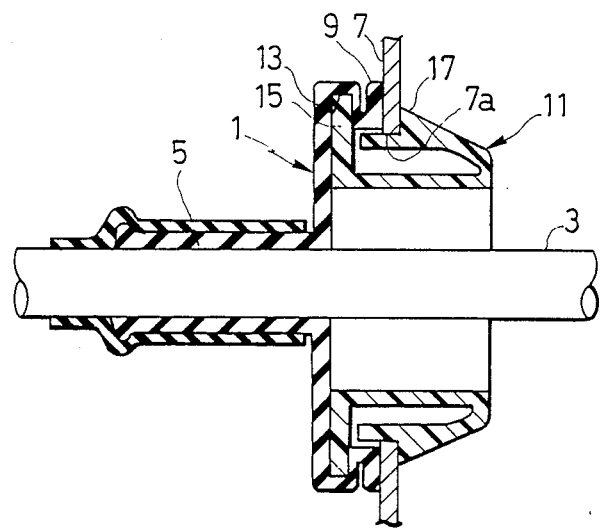
FIG. 1 is a cross-sectional view showing a conventional grommet.
Figure 2:
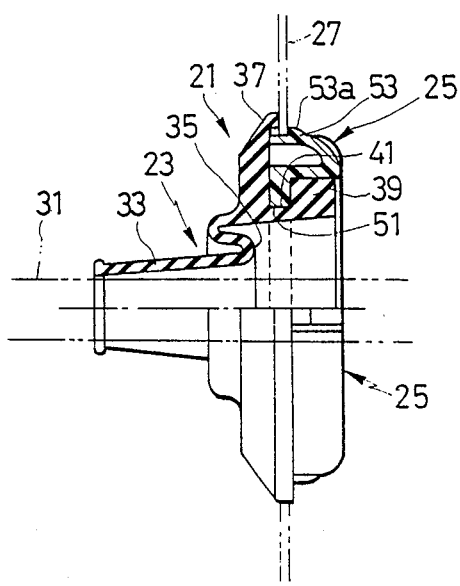
FIG. 2 is a cross sectional view of an embodiment of the present invention.

Hereinafter, an embodiment of the present invention will be described with reference to FIGS. 2 to 4.

A grommet 21 in his embodiment comprises an elastic member 23 formed of a rubber and a rigid member 25 formed of a synthetic resin. The grommet is mounted, for example, to a fixing hole 29 formed in a partition panel 27 which separates an engine room and a compartment of an automobile.

The elastic member 23 has a cylindrical wire securing portion 33 for securing a bundle of electric wires 31 which passes thereinto. The wire securing portion 33 tapers such that its diameter becomes reduced toward the distal side thereof, and the inner diameter at the distal side is a little smaller than the outer diameter of the bundle of electric wires 31.

The elastic member 23 has a sealing lip 37 having a flange shape, which elastically contacts with the surface of the partition panel 27 for presenting a water-proof effect. The sealing lip 37 is coupled with the wire securing portion 33 through a flexibly bending portion 35.

At the opposite side of the elastic member 23 to the wire securing portion 33, there is formed a cylindrical fitting portion 39 whose inner diameter is larger than the outer diameter of the bundle of the electric wires 31. On the outer periphery of the fitting portion 39 at the side of the sealing lip 37, there is formed a concave portion 41. The concave portion 41 comprises four grooves and four ribs respectively formed along the circumferential direction of the fitting portion 39, and these grooves and ribs are formed in an alternating arrangement as shown in FIG. 4.

The rigid member 25 is formed from a pair of half-cup members as shown in FIG. 4. These two half-cup members are composed together by fixing each convex part 45 to each concave part 47, which are formed in the end faces of these two half-cup members alternately and respectively.

The rigid member 25, that is, the thus composed half-cup members, has a cylindrical fitted portion 49 to be fitted onto the fitting portion 39 of the elastic member 23 when the elastic member 23 is composed with the rigid member 25. The fitted portion 49 has an inner periphery 49a and a curved outer periphery 49b. On one side of the inner periphery 49a of the fitted portion 49, which is located at the side of the sealing lip 37 of the elastic member 23, there is provided a convex portion to be fitted to the concave portion 41 of the elastic member 23. The convex portion is formed from four plate-shaped protrusions 51 which are respectively inserted and engaged in the grooves of the concave portion 41 of the elastic member 23.

The rigid member 25 further includes a lock portion which comprises four lock members 53 formed in the outer periphery of the fitted portion 49 at equal intervals. Each lock member 53 is formed from a plate-like member flexibly supported to the fitted portion at one end thereof and having a locking projection 53a at the other end. On the insertion of the grommet 21 to a fixing hole 29 of the partition panel 27, each locking projection 53a of the lock members 53 is in engagement with the partition panel 27. Then, the lock members 53 themselves are deformed and then restored so as to lock with the partition panel 27, so that the grommet can be firmly mounted to the partition panel 27 as shown in FIGS. 2 and 3.

On the outer periphery of the fitted portion 49, there are formed panel stoppers 55 which are engaged with the edge of the fixing hole 29 at the opposite side of the locking projections 53a when the grommet 21 is mounted to the partition panel 27. The outer diameter of the panel stoppers 55 is formed smaller than the outer diameter of the sealing lip 37 of the elastic member 23.

In the thus constructed grommet, the bundle of the electric wires 31 is inserted into the wire securing portion 33 of the elastic member 23 and then secured therein. In this case, the distal side of the wire securing portion having a small inner diameter is expanded by the bundle, thereby securing wire securing portion 33 around the bundle of electric wires 31 near the distal side thereof. Then, the two half-cup members of the rigid member 25 are closed to each other from the outside of the elastic member 23 such that they become engaged with each other. When this is done, the plate-shaped protrusions 51 of the rigid member 25 are fixed in the concave portion 41 of the elastic member 23, so that the elastic member 23 and the rigid member 25 are composed integrally. The composition can be carried out with ease since it is completed only by attaching the rigid member 25 to the elastic member 23 from the outside thereof. Moreover, even when the bundle of electric wires 31 is pulled by some force, which would then also act on the elastic member 23, the force will be absorbed in the bending portion 35 of the elastic member 23. Additionally, since the rigid member 25 holds the elastic member 23 from the outside thereof, it is difficult to separate these members, so that the engaging state of the two portions is extremely stable.

Further, since the rigid member 25 is engaged with the elastic member 23 by engaging a plurality of the protrusions 51 of the former into the corresponding grooves 41 of the latter, it becomes much more difficult to separate the members.

When the bundle of electric wires 31 appearing outside the rigid member 25 is pulled, the distal end portions of the lock members 53 of the rigid member 25 are urged inwardly by the contacts with the peripheral edge portion of the fixing hole 29 of the partition panel 27. As a result, the lock members 53 themselves are deformed by the urging force, and then restored when the locking projections 53a pass the peripheral edge portion of the fixing hole 29. Accordingly, the grommet 21, having the engaging state of the elastic member 23 and the rigid member 25, is fixed at the partition panel 27 by the restoring force of the lock members 53 in themselves. In this state, the panel stoppers 55 are in contact with the partition panel 27 at the opposite side of the locking projections 53a and thereby restrict the movement of the grommet 21 more than required in the pulled direction. Further, in this condition, the circumferential end portion of the sealing lip 37 of the elastic member 23 is in contact with the partition panel 27, thereby improving the sealability between an engine room and the compartment and enhancing the waterproofness of the compartment.

Now, in the above embodiment, two separated half-cup members of the rigid member 25 are described. However, it may be possible to have a pair of corresponding end portions of the two half-cup members connected with a hinge or the like, and then have the other pair of corresponding end portions thereof engaged with each other by the same fixing manner as mentioned above. Further, the concave portion 41 of the elastic member 23 may be formed to be a continuous groove without the ribs 43.

Finally, it is to be understood that even though the present invention has been described in its preferred embodiment, many modifications and improvements may by made without departing from the scope of the invention as defined by the appended claims.

What is claimed is:

1. A grommet for supporting bundle of electric wires which passes a fixing hole formed in a partition panel, which comprises:
   an elastic member having a wire securing portion in which the bundle of the electric wires is to be secured, a sealing lip to be in contact with the partition panel and a fitting portion having an outer periphery on which a concave portion is formed; and
   a rigid member to be assembled with the elastic member, the rigid member having a lock portion to be locked with the partition panel and a fitted portion to be fitted onto the fitting portion of the elastic member, and the fitted portion having an inner periphery on which a convex portion to be engaged with the concave portion of the fitting portion of the elastic member when the elastic member is assembled with the rigid member is formed.

2. A grommet as claimed in claim 1, wherein the rigid member comprises a pair of half-cup members which are engageable with each other.

3. A grommet as claimed in claim 2, wherein the half-cup members are coupled by a hinge.

4. A grommet as claimed in claim 1, wherein the concave portion of the fitting portion of the elastic member is a circumferential groove formed on the fitting portion of the elastic member.

5. A grommet as claimed in claim 4, wherein a plurality of ribs are provided in the circumferential groove so as to define a plurality of grooves.

6. A grommet as claimed in claim 5, wherein the convex portion of the fitted portion of the rigid member is a plurality of protrusions, and each of the protrusion is to be engaged with each of the defined grooves of the fitting portion of the elastic member.

7. A grommet as claimed in claim 11, wherein the wire securing portion of the elastic member is connected with the sealing lip through a flexibly bent portion.

8. A grommet as claimed in claim 7, wherein the wire securing portion has a tapered-cylindrical shape having a distal side, and the inner diameter of the distal side is smaller than the diameter of the bundle of the electric wires.

* * * * *

UNITED STATES PATENT AND TRADEMARK OFFICE
CERTIFICATE OF CORRECTION

PATENT NO. : 4,912,287

DATED : March 27, 1990

INVENTOR(S) : Mamoru ONO et al

It is certified that error appears in the above-identified patent and that said Letters Patent is hereby corrected as shown below:

Column 1, line 38, "bundle_of" should be --bundle of--.

Column 3, line 22, "his" should be --this--.

Claim 1, column 5, line 24, after "supporting" add --a--.

Claim 7, column 6, line 25, "claim 11," should be --claim 1,--.

Signed and Sealed this

Twenty-third Day of July, 1991

Attest:

HARRY F. MANBECK, JR.

*Attesting Officer*     *Commissioner of Patents and Trademarks*